United States Patent [19]

Hahn et al.

[11] Patent Number: 5,454,033
[45] Date of Patent: Sep. 26, 1995

[54] APPARATUS AND METHOD FOR CONTROLLING ACCESS TO A TELEPHONE

[75] Inventors: Harry B. Hahn, Antioch; Lawrence A. Ball, Glenview; James G. Ferro, Calumet City; Travis Marlatte, Evanston, all of Ill.

[73] Assignee: Rauland-Borg Corporation, Skokie, Ill.

[21] Appl. No.: 100,864

[22] Filed: Aug. 2, 1993

[51] Int. Cl.⁶ .................................................. H04M 1/66
[52] U.S. Cl. .................................. 379/198; 379/196
[58] Field of Search ............................ 379/130, 132, 379/192, 198, 200

[56] References Cited

U.S. PATENT DOCUMENTS

| | | | |
|---|---|---|---|
| 4,346,264 | 8/1982 | Sharvit | 379/198 |
| 4,511,765 | 4/1985 | Kuo | 379/200 |
| 4,656,657 | 4/1987 | Hunsicker | 379/131 X |
| 4,924,499 | 5/1990 | Serby | 379/200 |
| 4,993,062 | 2/1991 | Dula et al. | 379/189 X |

FOREIGN PATENT DOCUMENTS

| | | | |
|---|---|---|---|
| 56-62492 | 5/1981 | Japan | 379/192 |
| 59-23666 | 7/1984 | Japan | 379/192 |
| 1-71253 | 3/1989 | Japan | 379/192 |

OTHER PUBLICATIONS

Hello Direct Catalog, 1991, p. 38.

*Primary Examiner*—James L. Dwyer
*Assistant Examiner*—Daniel S. Hunter
*Attorney, Agent, or Firm*—Leydig, Voit & Mayer, Ltd.

[57] ABSTRACT

An apparatus and method is provided for limiting the connection time of selected telephone lines in a private branch exchange (PBX) telephone system to telephone numbers dialed therefrom. A maximum connection time is programmed into the system for selected lines. Calls are automatically terminated if the duration of the call exceeds the maximum time. The selected line is prevented from re-dialing the called number for a certain period of time. If desired, the selected telephone line is automatically enabled and disabled by the system at predetermined times. The telephone system may also incorporate other conventional features for certain ones of the telephone lines in the PBX system, including limited prefix dialing capabilities, limited area code dialing capabilities, blocking of incoming calls, and the like.

21 Claims, 10 Drawing Sheets

| CLASS OF SERVICE TABLE |
| --- |
| NUMBER 1 |
| NUMBER 2 |
| NUMBER 3 |
| NUMBER 4 |
| ⋮ |
| NUMBER $N_3$ |
FIG. 4A
| CLASS ASSIGNMENT TABLE | |
| --- | --- |
| LINE NUMBER 1 | CLASS NO. |
| LINE NUMBER 2 | CLASS NO. |
| LINE NUMBER 3 | CLASS NO. |
| LINE NUMBER 4 | CLASS NO. |
| ⋮ | ⋮ |
| LINE NUMBER $N_4$ | CLASS NO. |
FIG. 4B
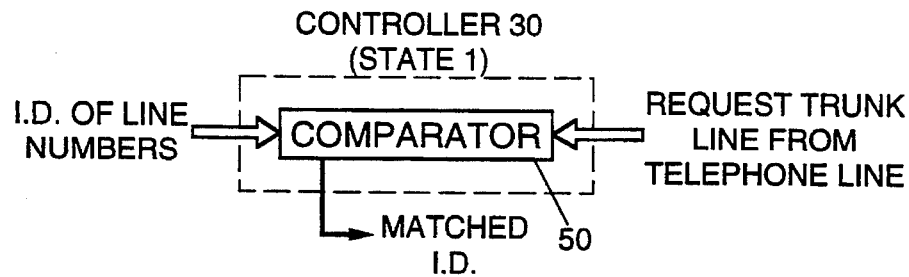
FIG. 4C
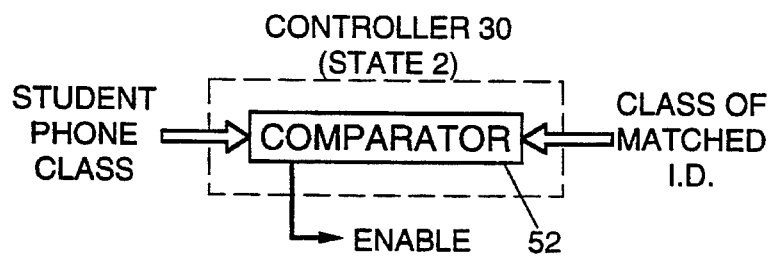
FIG. 4D
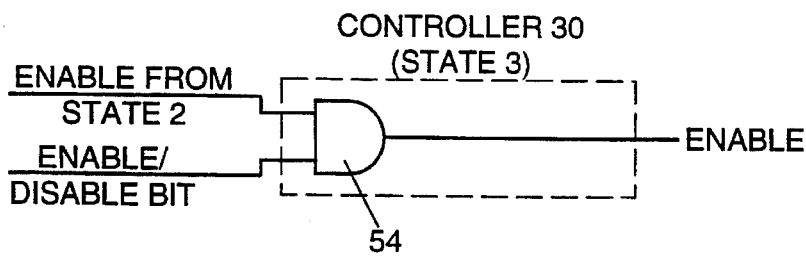
FIG. 4E

ALLOWED AREA CODE TABLE
| AREA CODE NUMBER 1 |
|---|
| AREA CODE NUMBER 2 |
| AREA CODE NUMBER 3 |
| AREA CODE NUMBER 4 |
| ⋮ |
| AREA CODE NUMBER $N_5$ |
FIG. 5A
PREFIX RESTRICTION TABLE
| PREFIX NUMBER 1 |
|---|
| PREFIX NUMBER 2 |
| PREFIX NUMBER 3 |
| PREFIX NUMBER 4 |
| ⋮ |
| PREFIX NUMBER $N_6$ |
FIG. 5B
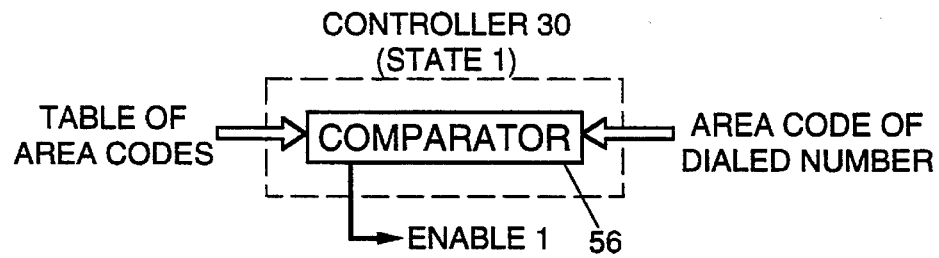
FIG. 5C
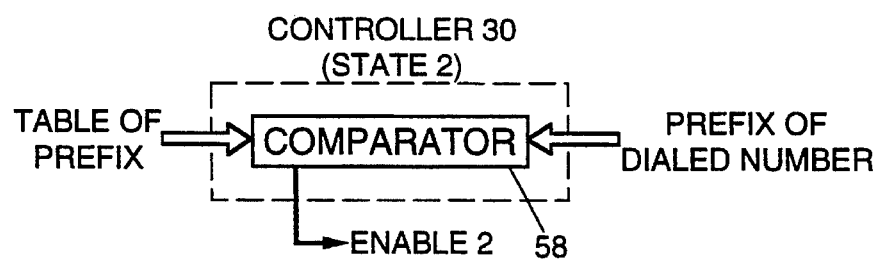
FIG. 5D
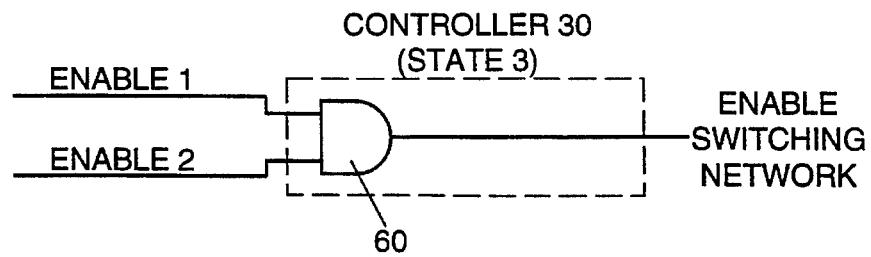
FIG. 5E

STUDENT PHONE RESTRICTION TABLE
|  | AREA CODE | PREFIX | SUFFIX | START TIME |
|---|---|---|---|---|
| NUMBER 1 |  |  |  |  |
| NUMBER 2 |  |  |  |  |
| NUMBER 3 |  |  |  |  |
| NUMBER 4 |  |  |  |  |
| ⋮ |  |  |  |  |
| NUMBER $N_7$ |  |  |  |  |
FIG. 6A
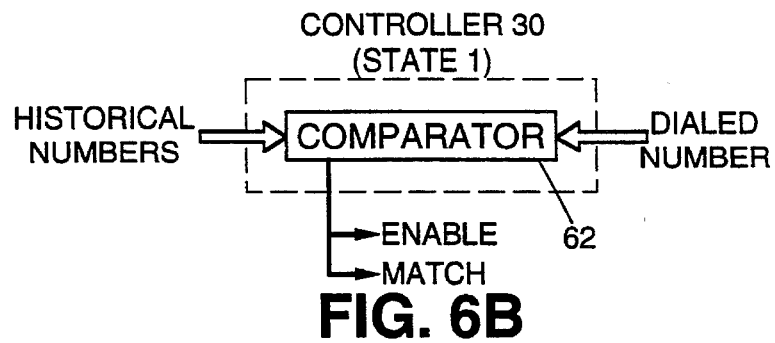
FIG. 6B
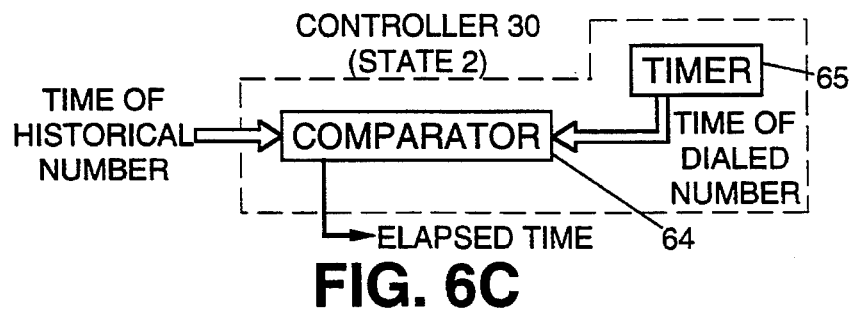
FIG. 6C
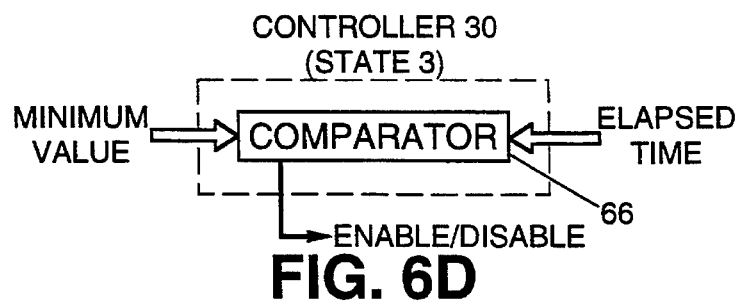
FIG. 6D

| Student Phone Editor | | |
|---|---|---|
| F1-Editor Selection | F4-Block Status | F7-Save to Disk | F10-Print |
| F2-External Prog | F5-Not used | F8-Capture from TC5 | |
| F3-Not used | F6-Load From Disk | F9-Send Data to TC5 | |
| ALT-F1-Select Block | ALT-F2-Copy Blocks | | |

Maximum length of student phone call:  180   seconds
Duration to prevent same number: 6000   seconds
Access code for outside trunk line:  9

30 to 900 seconds, 0 will allow unrestricted length call

FIG. 9A

| | [ Time Base Events Editor ] | |
|---|---|---|
| F1-Editor Selection | F4-Block Status | F7-Save to Disk | F10-Print |
| F2-External program | F5-Copy Prev Atribs | F8-Capture from TC5 | |
| F3-Sort by Time | F6-Load From Disk | F9-Send Data to TC5 Del-Delete Record | |
| ALT-F1-Select System Block | | ALT-F2-Copy System Blocks | |

| Item | Time | Event |
|---|---|---|
| 0 | 06:00 | 6 |
| 1 | 15:30 | 5 |
| 2 | 00:00 | 0 |
| 3 | 00:00 | 0 |
| 4 | 00:00 | 0 |
| 5 | 00:00 | 0 |
| 6 | 00:00 | 0 |
| 7 | 00:00 | 0 |
| 8 | 00:00 | 0 |
| 9 | 00:00 | 0 |
| 10 | 00:00 | 0 |
| 11 | 00:00 | 0 |
| 12 | 00:00 | 0 |
| 13 | 00:00 | 0 |

Event 1-4 Switch System Blocks   5-Enable Student Phone   6-Disable Student Phone

FIG. 9B

APPARATUS AND METHOD FOR CONTROLLING ACCESS TO A TELEPHONE

FIELD OF THE INVENTION

The present invention relates generally to private branch exchange telephone systems, and more particularly to an apparatus and method for controlling access to selected telephones connected thereto.

BACKGROUND OF THE INVENTION

Conventional private branch exchange (PBX) telephone systems often incorporate features which limit the capabilities of certain extensions. For example, certain extensions may be set up to block incoming calls, while others are set to prevent outgoing calls from being made therefrom. Other limitations include allowing outgoing calls, but preventing the caller from connecting to certain area codes and prefixes. While these phone systems thus limit the connection capabilities of extensions connected thereto, there is no time limit to the calls made.

Telephone calls are often made from public telephone booths and the like wherein the calling telephone is disconnected at the central station after a time expires, but not locally in private branch exchanges. Moreover, such telephones are disconnected in dependence on the expiration of purchased time, which typically depends on the location of the number dialed, and not on a fixed, preprogrammed basis independent of these other factors.

Nevertheless, in certain environments such as schools, students often need access to a telephone, for example to call home to arrange a ride. Schools often provide one or more telephone extensions for this purpose. However, if a significant number of students need access to such telephones at approximately the same time, for example following an after-school activity, the students are required to wait their turn until a telephone becomes available. However, without supervision, a single student is able to tie-up one of the telephones provided for an excessive amount of time, inconveniencing other students or otherwise abusing telephone privileges.

OBJECTS AND SUMMARY OF THE INVENTION

Accordingly, it is a primary aim of the present invention to provide a private branch exchange telephone system capable of limiting the connection time of at least one selected telephone extension to telephone numbers dialed therefrom.

It is a related aim to provide a telephone system of the above kind that prevents the selected extension from re-dialing the called number soon thereafter.

It is another object of the present invention to provide a telephone system of the above kind that activates such extensions only at predetermined times.

Another related object is to provide a telephone system of the above kind incorporating other conventional features including limited prefix dialing capabilities, limited area code dialing capabilities, blocking of incoming calls, and the like.

It is another object to provide a telephone system that limits the connection time of calls made therefrom independent of purchased time.

Briefly, the present invention provides an apparatus and method for limiting the connection time of at least one selected telephone extension in a private branch exchange telephone system. The system first awaits a request for connecting the selected telephone extension to a telephone having a telephone number associated with the public telephone network. The requested number is then switched to the network to connect the selected extension to the network telephone. The elapsed time of the call monitored, and the call is terminated upon the earlier occurrence of either a manual request for termination or the elapsed time achieving a predetermined maximum duration.

Other objects and advantages will become apparent from the following detailed description when taken in conjunction with drawings, in which:

BRIEF DESCRIPTION OF THE DRAWINGS

FIGS. 4A and 4B are tables illustrating the format of data stored in memory for use by the system controller in accordance with the invention;

FIGS. 4C–4E are state machine diagrams of the system controller for controlling the student phone in connection with the data stored in the memory illustrated by the tables of FIGS. 4a and 4b;

FIGS. 5A and 5B are tables illustrating the format of data stored in memory for use by the system controller in accordance with the invention;

FIGS. 5C–5E are state machine diagrams of the system controller for controlling the student phone in connection with the data stored in the memory illustrated by the tables of FIGS. 5A and 5B;

FIG. 6A is a table illustrating the format of data stored in memory for use by the system controller in accordance with the invention;

FIGS. 6B–6D are state machine diagrams of the system controller for controlling the student phone in connection with the data stored in the memory illustrated by the table of FIGS. 6A and 7A;

FIGS. 9A and 9B are user interfaces for configuring the system controller in accordance with the invention;

Figure 1:
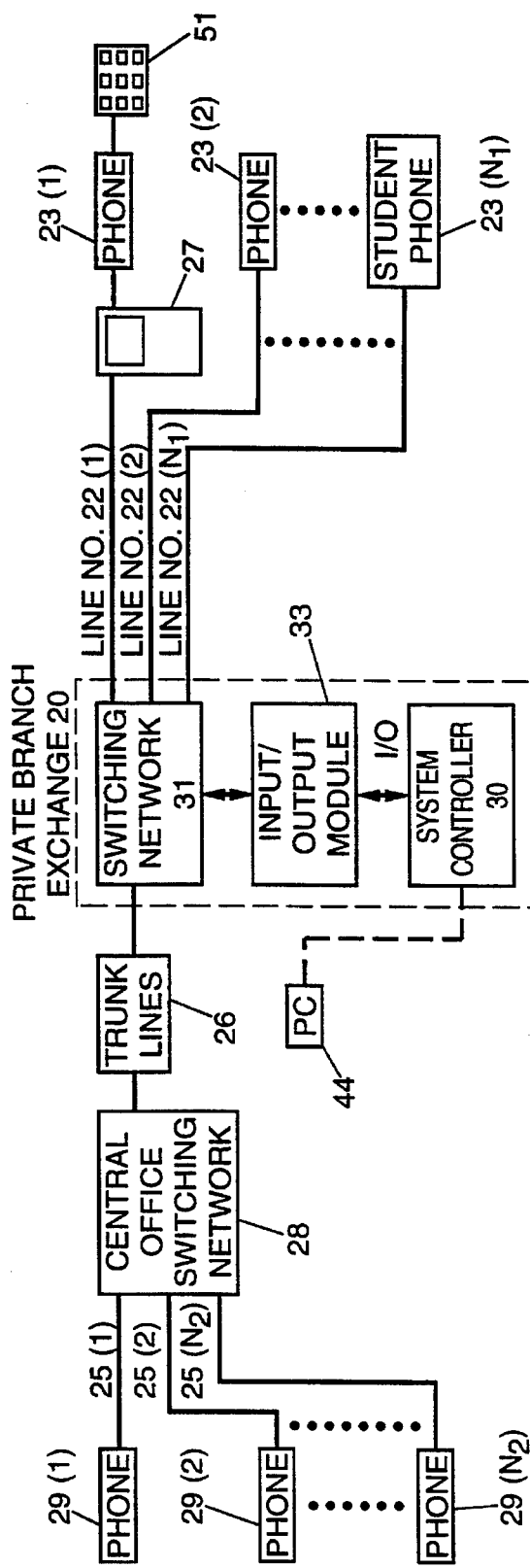
FIG. 1 is a block diagram of a computer controlled multi-link administrative telephone system according to the invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning now to the drawings and referring first to FIG. 1, a Private Branch Exchange (PBX) telephone system 20 connects telephone extensions 22(1) to 22($N_1$) associated therewith to telephones in a public network 24 and to each other. The PBX system 20 is substantially as disclosed and illustrated in U.S. Pat. No. 4,744,103 to Dahlquist et al., which is assigned to the same assignee as that of this invention. The Dahlquist et al. patent is incorporated herein by reference. As explained in the Dahlquist et al. patent, the PBX system 20 links telephone lines 22(1) to 22($N_1$) and their respective telephones 23(1) to 23($N_1$) to one another and to trunk lines 26 of a public network 24. In a conventional fashion, the trunk lines are connected to a central office (CO) 28 that connects a call to a particular one of the telephones 29(1) to 29($N_2$) on respective lines 25(1)–25($N_2$), where $N_2$ may or may not be the same value as $N_1$.

As exemplified by the telephone line 22(1) in FIG. 1, some of the telephone lines may include a display 27 in series connection with the telephone 23(1). The display 27 functions as a prompt for the user of the telephone 23(1) as explained hereinafter in connection with FIG. 11.

As set forth in greater detail in the Dahlquist et al. patent, the PBX 20 is primarily controlled by a system controller 30, which is preferably microprocessor-based. The plurality of telephone lines 22(1) to 22($N_1$) serviced by the PBX system 20 are received by a switching network 31 that selectively connects the lines to one another and to the trunk lines 26 of the public network 24. As set forth in detail in the Dahlquist et al. patent, which is incorporated herein by reference, data and command signals are transmitted along bi-directional communications paths and an input/output module 33 that interfaces the controller 30 to the switching network 31.

Figure 2:
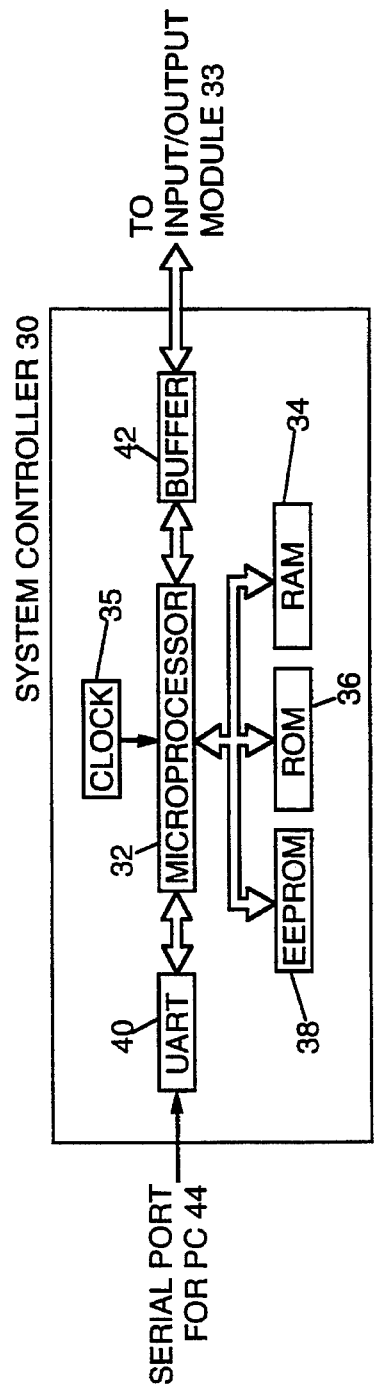
FIG. 2 is a block diagram of a system controller for the telephone system of FIG. 1, including a microcomputer and its interfaces.

As illustrated in FIG. 2, the system controller 30 preferably includes a microprocessor 32 connected in a conventional manner to a system clock 35 and storage devices such as a random access memory (RAM) 34, a read only memory (ROM) 36 and an erasable/programmable read only memory (EEPROM) 38. In order to port the microprocessor 32 to external devices, a universal asynchronous receiver/transmitter (UART) 40 and a conventional buffer 42 serve as input/output devices that allow various functions to be performed as described below.

In accordance with one important aspect of the invention, one or more of the plurality of telephone lines 22(1) to 22($N_1$) are selected by the system controller 30 to have a maximum time T2 of connection for each call. If a call on one of the selected lines equals or exceeds the maximum time T2, the system controller 30 disconnects the call. In order to warn the caller that termination of the call is imminent, the system controller provides a warning signal to the caller at a time T1, which is preferably equal to the time T2 minus a fixed interval (e.g., five (5) seconds). Unless the number dialed by the caller is of a special category (e.g., emergency numbers such as 911), the system controller 30 always terminates the call when the time of the call equals or exceeds the time T2. In this manner, the intended use of the phone is assured. Specifically, by selecting an appropriate value of the time T2, calls placed on the selected telephone must be brief and to the point. In an environment such as a school, this requirement prevents one of the telephones 22(1) to 22($N_1$) intended for student use from being monopolized by a few students who engage in long conversations unrelated to school activities. Instead, the telephone is free for short calls such as those necessary to make arrangements for rides home and the like.

In the preferred embodiment, the invention is executed by the system controller 30 under program control. The program is stored in the ROM 36. A copy of the program is attached as Appendix A. The program is part of a larger system program that controls other aspects of the PBX system 20 that are unrelated to the invention. In this connection, the Dahlquist et al. patent includes a copy of an object code stored in the ROM 36 for configuring the general functioning of the PBX system 20. As part of the task of initializing the PBX system 20, an authorized operator enters a value for the time T2 as well as the values of other parameters described hereinafter by way of a port to the system controller provided by the UART 40. In the preferred embodiment, the input device is simply a standard personal computer (PC), generally designated 44 in FIG. 1.

Figure 3A:
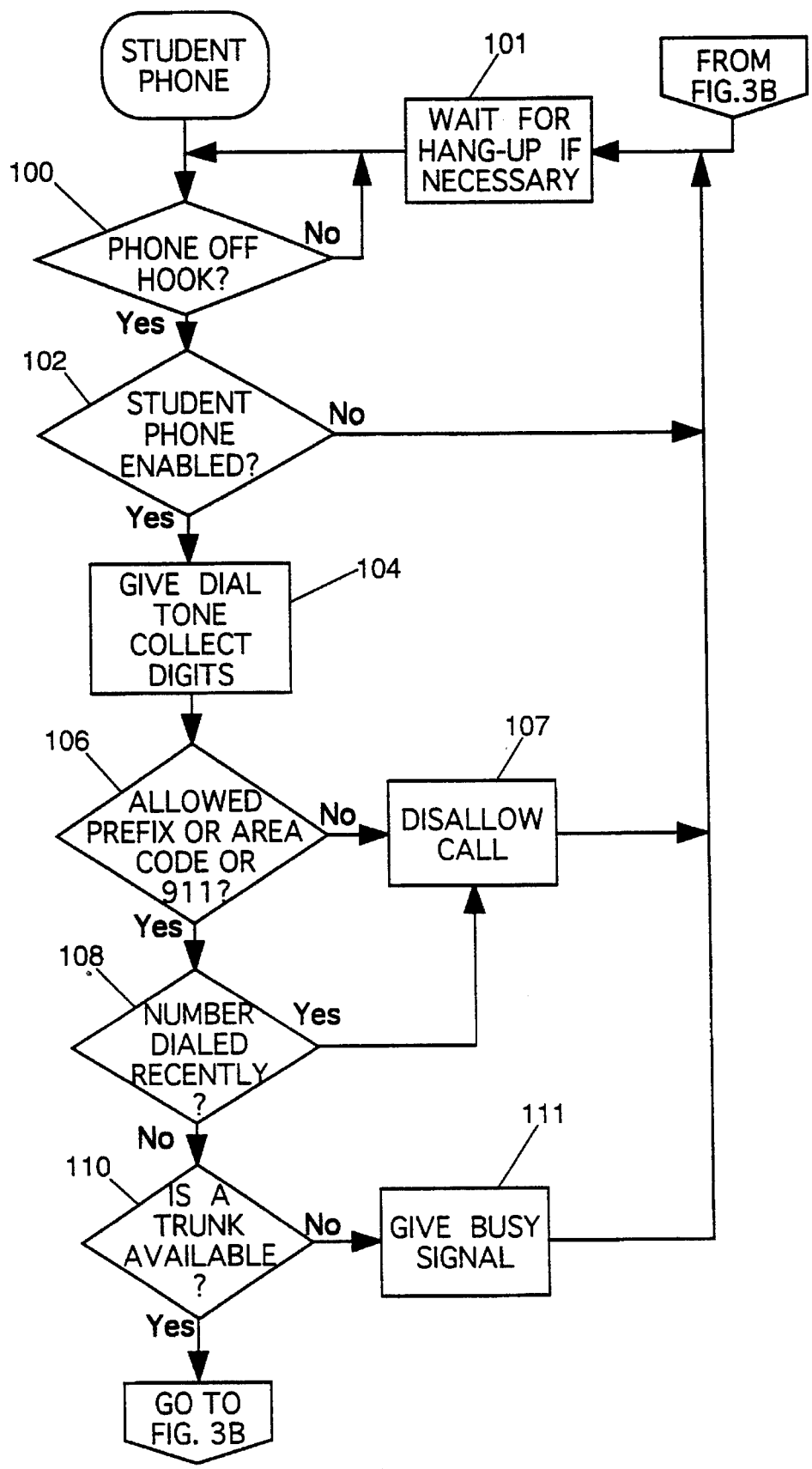
FIGS. 3A–3B are a flow diagram describing the control by the system of a "student" telephone according to the invention.
Figure 3B:
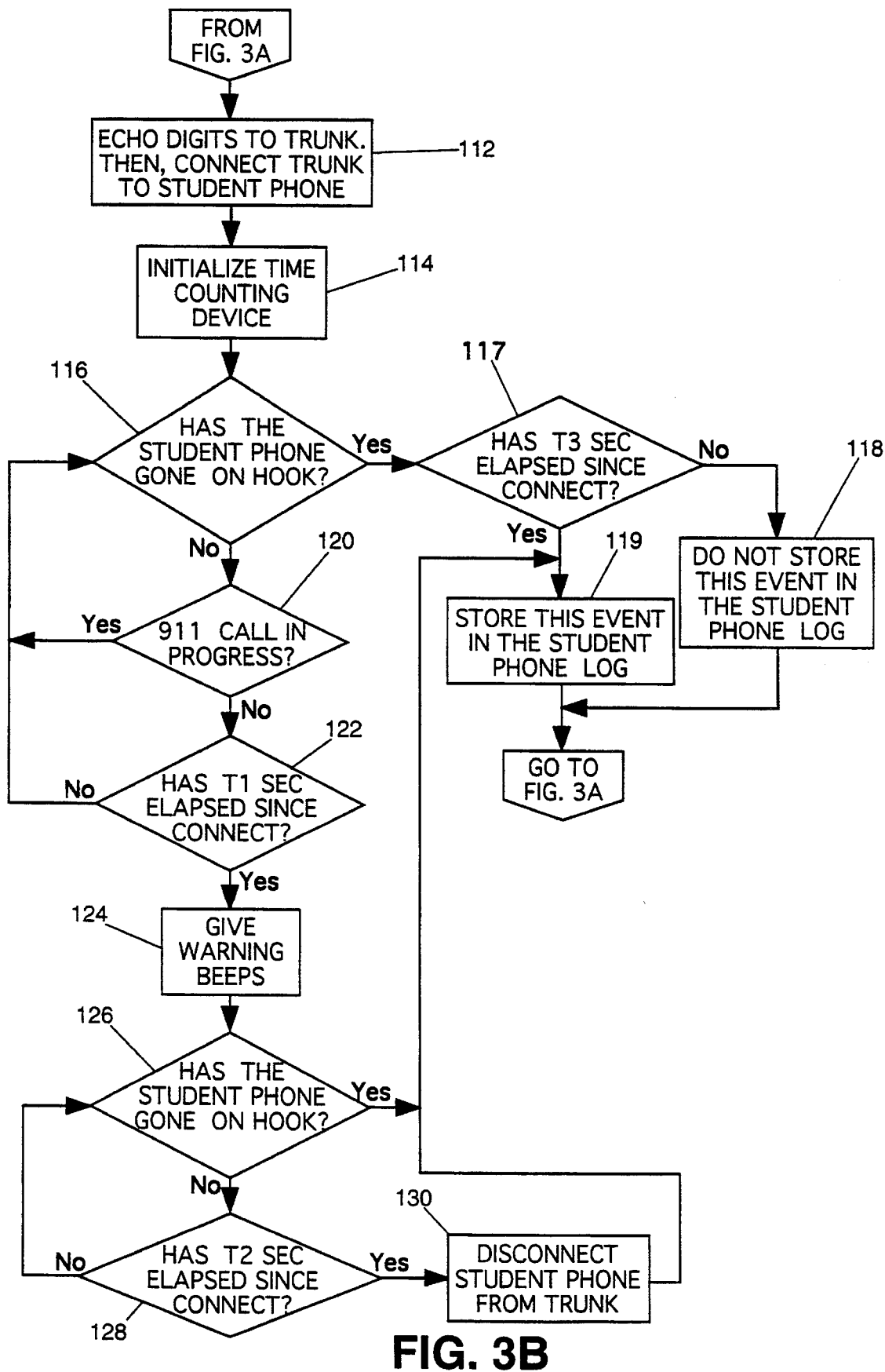

Turning to the diagrams of FIGS. 3A–3B, the features of the present invention are described by the steps taken by the system controller 30 under program control in response to a request from one of the telephone lines 22(1) to 22($N_1$) for a connection to the public telephone network 24. For ease of understanding, the telephone line described in the flow diagram is identified as a "student phone," although there is no intention to limit the invention to an educational environment.

In the initial step 100, the system controller 30 polls the status of a designated student phone (such as telephone line 22($N_1$)) on a regular basis to determine whether the student phone is indicating that it is off-hook. If the phone is not off-hook, no further action other than regular status polling takes place.

In accordance with another aspect of the invention, if the student phone is detected to be in an off-hook status, the system then determines at step 102 if the telephone is enabled at the current moment in time. As discussed in greater detail hereinafter, the telephone line corresponding to the student phone (i.e., line 22($N_1$)) may be automatically enabled or disabled at certain times by the system controller 30 or by manual override from a properly authorized one of the lines 22(1) to 22($N_1$). If the student phone is not enabled, the system waits for the extension to be returned to on-hook status (i.e., hung up, step 101) before taking any further action. Of course, a message, signal or alarm may be provided by the system to notify the caller of the extension's disabled status, or to indicate that the phone has not been hung up in a timely manner.

In step 104, when the student phone is taken off-hook while enabled, a dial tone is provided, which may be a conventional dial tone or any similar such signal. At this time, the system awaits the "dialing" of a telephone number. As used herein, a "dialing" of a telephone number means the entering of data to identify a telephone line for connecting to the requesting line. The data can be entered in any number of ways, but it typically is achieved by keystrokes to a keypad at the telephone serviced by the requesting line. Should the number not be dialed in a timely manner, the system again can take appropriate action such as sounding an appropriate tone to the caller.

Once an appropriate telephone number has been entered into the system 20 at step 106, the dialed number is analyzed by the system to determine if access to that dialed number will be allowed. For example, certain prefixes, area codes, and other such unauthorized numbers are blocked by the system 20, while numbers such as those corresponding to local numbers and emergency (911 or the like) numbers are acceptable. In a preferred embodiment, as shown in step 107, disallowance of a dialed number triggers a message or other such signal to notify the caller of the denial of access to that number.

Assuming that the dialed number is otherwise allowable, before attempting to connect the telephone to the dialed number, the system 20 first determines in step 108 if the number was recently dialed at a previous time. The dialed number is compared against those stored in a student phone log accumulated within the system RAM 34. This comparison prevents the caller from defeating the time-limitation feature by simply re-dialing a called number. If the number has been determined by the system 20 to have been dialed too recently, a similar disallowance message or signal such as in step 107 is provided.

The amount of time that transpires before a caller will be allowed to re-dial a previously dialed number is programmable into the system 20 by an authorized operator/programmer as a parameter. Alternatively, the system 20 can be arranged to base the determination of when to allow a number to be re-dialed on the number of calls that have occurred between re-dialed numbers. For example, if four (4) or more calls have occurred since a telephone number has been previously called, the redialing may be allowed.

If the PBX system 20 has not disallowed the number for the above reasons, the system next determines in step 110 if one of the trunk lines 26 to the public network 24 is available so that the call can be placed. If all the trunk lines 26 available to the PBX system 20 are currently being utilized, the system controller 30 provides a busy signal to the caller (step 111) and awaits the hanging up of the student phone line. As shown by step 112, if a trunk is available, the PBX system 20 echoes the previously dialed digits to the select one of the trunk lines 26 and connects the trunk to the student phone.

Once connection has been made, the measurement of an elapsed time of the call is initialized as indicated in step 114. Preferably, the initialization step comprises the obtaining of an initial time reading by the system 20 from an internal clock, and storing the reading to correspond with the student phone. Alternatively, the time initialization step may consist of starting an internal timer or resetting a counter to zero or the like for that telephone extension.

As the call is in progress, the system regularly checks at step 116 to determine if the phone has gone on hook (i.e., the caller has hung up). If so, the system branches to step 117 and compares the amount of time that has elapsed since the initialization of the timer with an authorized-operator preprogrammed time T3 (previously entered as a parameter). This is preferably done by obtaining a new time from the clock, subtracting the previously stored initialization time therefrom, and comparing the difference with the preprogrammed time T3. If the elapsed time is less than the preprogrammed time T3, the system does not log the called number in the student phone log (step 118), so that the caller can re-dial the number soon thereafter instead of having the call blocked at step 108. If a time equal to or greater than T3 has elapsed, the number is written into the student phone log within the system RAM 34 at step 119. Regardless of whether logged or not, the system 20 then returns to await another call request.

T3 is ordinarily a short time interval that approximates the amount of time that it takes for a caller to be connected to one of the trunk lines 26 and subsequently hang up after receiving a busy signal, no answer, an answering machine instead of the party desired, and so on. If this is the case, the number is not logged into the recently dialed log so that the caller is not blocked (at step 108) from attempting another call to the same number a short time later.

If the student phone has not gone on hook at step 116, the system checks to see if an emergency call (for example to 911) is in progress at step 120. If this is the case, the caller is given unlimited time to complete the call. Similarly, for this exceptional case it can be appreciated that calls to an emergency number will not be blocked if previously dialed (step 108), and may even be arranged to automatically enable the student phone if otherwise disabled (see step 102).

In the ordinary case of a non-emergency call, while a call is in progress, at step 122 the system 20 compares the elapsed time against another (previously entered parameter) operator-programmed time T1. T1 corresponds to a warning time that is used to indicate to the caller that the student phone will be automatically disconnected from the trunk lines 26 if the call is not manually terminated in a short time. The comparison is done in a like manner to that of T3—i.e., obtaining the current time, subtracting the stored initialization time, and comparing the difference against T1. If the time T1 has not yet elapsed, the system 20 returns to step 116 to determine if the caller has hung up. Alternatively, if the time interval T1 has elapsed, the system 20 provides a series of warning beeps or the like at step 124 to inform the caller that the call will soon be terminated. For example, this feature might notify the student of the need to quickly provide essential information to the called party.

Once the warning has been earlier provided, the system 20 again checks at step 126 to detect if the student phone has gone on hook, that is, to determine if the caller has manually terminated the call. If so, the system 20 logs the call into the student phone log (step 119) and returns to await another call. It can be readily appreciated that the warning time T1 is ordinarily substantially greater than the time T3 allowed for determining whether to log the call or not, so it is not necessary to compare the elapsed time with the time interval T3 before logging the just-terminated call.

If the call is still in progress at step 126, at step 128 the system 20 compares the time that has elapsed since the timer initialization (step 114) with a maximum connection time T2 previously programmed as a parameter into the system by the authorized operator/programmer. The caller may either continue the call or terminate the call manually until the elapsed call time equals or exceeds the maximum connection time T2. If the elapsed time equals the time T2, at step 130 the system 20 automatically terminates the call by disconnecting the student phone from the trunk lines 26.

Subsequently, the dialed number is stored in the student phone log at step 119, before the system 20 awaits hang-up at step 101 to standby for a new call.

Referring to the illustrations of FIGS. 4–7, in executing the steps of the flow diagram of FIGS. 3A–3B, the system controller 30 accesses various tables of information stored in the RAM 34 and EEPROM 38. In a manner well understood in the art of computer-based systems, the controller 30 is illustrated as various state machines in each of FIGS. 4–7 in connection with execution of particular ones of the steps of the flow diagram. In each of the FIGS. 4–7, the state machine is illustrated as a comparator having two inputs and an output. One of the inputs is either data from a table in memory or data from a previous state machine. The other input is typically data generated as a direct result of a student taking the student phone off the hook and dialing a number, typically by way of keystrokes to a keypad on the student phone. The output of the comparator is the output of the controller 30 that selectively allows the switching network 24 to connect the student phone to the trunk lines 26 of the public telephone network.

In the EEPROM 38 of FIG. 2, the data formatted as illustrated in the exemplary tables of FIGS. 4A and 4B configure each of the telephone lines 22 as a particular class of lines having features defined by the class. For example, some of the telephone lines 22(1) to 22($N_1$) may be assigned a class that allows only calls within the network of lines in the PBX system 20. Other telephone lines 22(1) to 22($N_1$) may have access to the public telephone network 24 but only to local numbers. Still other ones of the telephone lines 22(1) to 22($N_1$) may be assigned a class that utilizes the display 27, which can be used to display prompts to the user.

In the table of FIG. 4A, each configuration or class available to the telephone lines 22(1) to 22($N_1$) is identified by a data word. The total number of different classes is indicated as being $N_3$, which can be any number. The assignment of a classification to each of the telephone lines 22(1) to 22($N_1$) is memorialized in the table of FIG. 4B. The assignment of a class to one of the telephone lines 22(1) to 22($N_1$) can be done either by way of appropriate keystrokes to the PC 44 connected to the system controller 30 as illustrated in FIGS. 1 and 2 or by way of keystrokes to a keypad of one of the telephones connected to one of the telephone lines 22(1) to 22($N_1$). The assignment of a class to one of telephone lines 22(1) to 22($N_1$) using a keypad of a telephone 23(1) to 23($N_1$) on one of the lines is discussed hereinafter in connection with FIG. 11.

The system controller 30, as represented by the state machines of FIG. 4C, identifies a request from one of the telephone lines 22(1) to 22($N_1$) as a request from a student phone and then interrogates a memory location in the EEPROM 38 to determine whether the student phone is enabled or disabled. In step 102 of FIG. 3A, if the student phone is enabled, the switching network 31 is enabled to connect the student phone to the trunk lines 26 of the public telephone network 24.

In the first state machine illustrated in FIG. 4C, the system controller 30 is configured as a comparator 50 that receives data at one input that identifies which one of the telephone lines 22(1) to 22($N_1$) is requesting a connection to the public telephone network 24. At the other input of the comparator 50, the data from the table of FIG. 4B for each of the telephone lines are sequentially presented. When the system controller 30 detects a match between the two data inputs, it changes states to interrogate the data that defines the class of the requesting telephone line. Configured as a comparator 52 in a second state machine illustrated in FIG. 4D, the system controller 30 compares the input data identifying the class of student phone to the data stored in the EEPROM 38 (i.e., the data of table of FIG. 4B). If the requested telephone line is assigned the class designation for a student phone, the controller 30 enables the switching network 31, but only if the status of the class of student phones is indicated in memory to be enabled. In this regard, the third state machine of the controller 30 shown in FIG. 4E is configured as a detector whose function is best illustrated as an AND gate 54, having a first input from the output of the second state machine and a second input from the memory indicating whether the class of student phones is presently enabled or disabled. The memory indicating the present enable/disable state of the student phone is typically a single bit as shown in FIG. 4E. If both inputs are detected as enable signals, the AND gate passes an enable signal to the switching network 31 and the student phone is connected to the public telephone network 24.

When configured as a student phone, only numbers having selected area codes and local prefixes can be accessed by the telephone line 23($N_1$) of FIG. 1. In step 106 of the flow diagram of FIGS. 3A–3B, the system controller 30 determines if the number requested on line 23($N_1$) has an area code and prefix that is permitted. In order to make this determination, a table of allowed area codes and a table of restricted local prefixes as illustrated in FIGS. 5A and 5B are stored in the EEPROM 38.

To execute step 106 of the flow diagram of FIGS. 3A–3B, the system controller 30 can be described as the state machines of FIGS. 5C–5E. In the first state machine of FIG. 5C (I), the system controller 30 functions as a comparator 56 to compare the area code of the requested number and each of the area codes in the table of FIG. 5A. If the comparison provides a match, an enable signal ENABLE 1 is generated. Next, the local prefix of the requested number is compared by the system controller 30 to each of the prefixes in the list of prefixes stored in the EEPROM 38 as illustrated by the table of FIG. 5B. If the prefix of the requested number does not match one of the prefixes in the table of FIG. 5B, the system controller 30 shown as a comparator 58 in FIG. 5D generates a second enable signal ENABLE 2. In its third state shown in FIG. 5E, the system controller 30 compares the signals from the comparators 56 and 58 of the first two states in keeping with an AND function as illustrated. In its third state, the system controller functions as an AND gate 60; that is, if both enable signals ENABLE 1 and ENABLE 2 are present, the system controller 30 enables the switching network 31 to connect the telephone line 22($N_1$) to the trunk lines 26 of the public telephone network 24.

In keeping with another important feature of the invention, the RAM 34 of the system controller 30 contains a historical listing of the most recently called numbers that is referenced each time a number is dialed for the purpose of preventing a user from defeating the limitation on the time of connection by simply re-dialing the same number after the call is disconnected. In the embodiment of the invention illustrated herein, the time a connection is made for each dialed number is recorded with the number. The historical record of previous calls and the times they are made is compared to the present time and the number presently requested. If the value of the elapsed time between the present request for a number and the most recent previous request is less than a minimum value, the system controller 30 will not enable the switching network 31. Alternatively, if the value of the elapsed time is greater than the minimum value, the system controller 30 enables the switching network 31 to connect the student phone to one of the trunk lines 26.

Instead of comparing the value of an elapsed time between successive calls to the same number, the system controller 30 may be configured to simply count the number of calls to different numbers between consecutive calls to the same number. If the value of the count is less than a minimum value, the system controller 30 will not enable the switching network 31.

Referring to FIGS. 6A–6B, the RAM 34 of the system controller 30 includes a historical record of the numbers called from the student phone as exemplified by the table of FIG. 6A. In the illustrated embodiment, the historical record includes a time that each of the calls was placed. In the illustrated table, the time is recorded at the start of the call, but it could be the time of any other conveniently detected event associated with a phone call.

In step 108 of the flow diagram of FIGS. 3A–3B, the system controller 30 determines whether the number dialed from the student phone has been previously called within a predetermined minimum time period. To make this determination, the system controller 30 accesses the data stored in the table of FIG. 6A and sequences through the state machines of FIGS. 6B–6D in order to determine whether to enable the switching network 31 in response to the request from the student phone for one of the trunk lines 26.

In the first state machine of FIG. 6B, the system controller 30 functions as a comparator 62 that compares the dialed number with each of the previously dialed numbers in the table of FIG. 6A. If a match is not found, the system controller 30 enables the switching network 31 as indicated by the state machine of FIG. 6B. Step 108 of the flow diagram is then complete. Alternatively, if a match is found by the first state machine between the dialed number and one of the numbers of the table, the system controller 30 then compares the present time with the "start" time of the same number recorded in the table. In the state machine of FIG. 6C, the system controller 30 is configured as a comparator 64 that compares the "start" time of the recorded number and the present time from timer 65, which in effect is the "start" time of the dialed number. The comparator 64 subtracts these two "start" times to provide an elapsed time between times of the two calls. In a third state machine of the system controller 30 illustrated in FIG. 6D, the value of the elapsed time determined by the second state machine is compared to a minimum value, which has been programmed into the system and stored in the EEPROM 38 (see the table of FIG. 7A). In the third state machine of FIG. 6D, the system controller 30 is illustrated as a comparator 66 whose inputs are the value of the elapsed time determined by the second state machine and the minimum value for the elapsed time held in the EEPROM 38. If the value of the elapsed time is greater than the value of the minimum, then the system controller 30 enables the switching network 31.

Preferably, the table of historical numbers in FIG. 6A lists the numbers in a time sequence. When the state machine of the system controller 30 in FIG. 6B looks for a match with a dialed number it starts at the top of the list (i.e., the most recent previously called number) and then proceeds down the list to successively earlier called numbers. In this manner, the system controller 30 only needs to check the first occurrence in the table of the same number as that dialed, even though the number may appear more than once in the table.

Figure 7A:
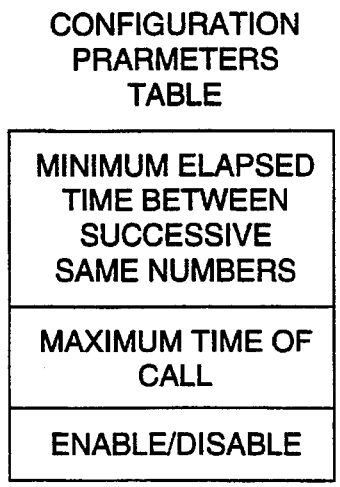
FIG. 7A is a table illustrating the format of data stored in memory for use by the system controller in accordance with the invention.

In FIG. 7A, a table is illustrated that exemplifies the memory locations in the EEPROM 38 that hold the primary configuration data for the student phone. At a first location, the value of the minimum elapsed time between successive calls to the same number is stored. At a second location, a value for the maximum duration T2 of a call is stored. The third location in the table of FIG. 7A holds the enable/disable bit, which represents the present state of the student phone; that is, whether it is enabled or disabled. This bit can be toggled as discussed herein in connection with FIGS. 8 and 10.

In step 128 of the flow diagrams of FIGS. 3A and 3B, the system controller 30 compares an elapsed time of a call to the value of the maximum elapsed time T2 for a call held in memory as illustrated by the table of FIG. 7A. In the state machine of FIG. 7B, the system controller 30 is configured as a comparator 68 that receives the value of the maximum elapsed time T2 at one input and a value of a timer 70 at a second input. In the illustrated embodiment, the timer 70 is initialized at the start of a call so that its output is in effect an elapsed time of the call that can be directly compared to the value of a maximum elapsed time T2 held in the EEPROM 38. As those skilled in the art of digital systems will appreciate, however, the timer 70 can start from any initial base value in measuring the elapsed time. For example, the timer 70 can simply start from zero and count forward, or it can read and store the real time when a connection is made and compare it to the present real time in order to adjust the time to a zero base and, thereby, provide an elapsed time value. However the timer 70 is configured, the comparator 68 of the system controller 30 in FIG. 7B disables the switching network 31 to disconnect the student phone from one of the trunk lines 26 only if the value of the elapsed time from the timer 70 exceeds the value of the maximum time T2 stored in the EEPROM 38.

Figure 8A:
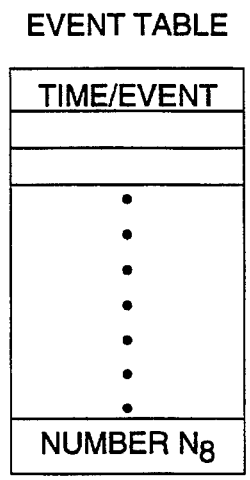
FIG. 8A is a table illustrating the format of data stored in memory for use by the system controller in accordance with the invention.
Figure 7B:
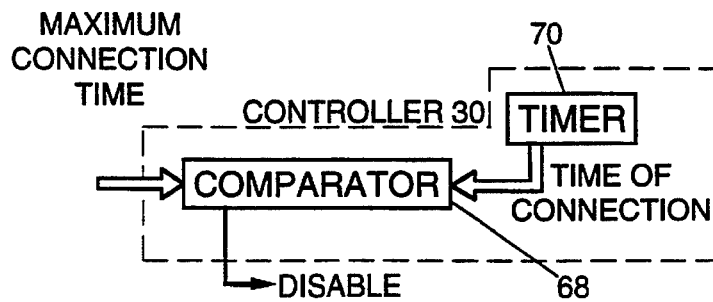
FIG. 7B is a state machine diagram of the system controller for controlling the student phone in connection with the data stored in the memory illustrated by the table of FIG. 7A.

As part of step 102 of the flow diagram of FIGS. 3A and 3B, the system controller 30 disables and enables the student phone in accordance with a schedule that is recorded in an event table stored in the EEPROM 38. An illustration of the event table is shown in FIG. 8A. Although the events controlled by the schedule in the event table include events other than the toggling of the enable/disable status of the student phone, it is only this event that is discussed herein. In the table of FIG. 8A, each event is scheduled by two data words. The first data word defines the event to be executed, and the second data word defines the time of execution. In connection with the student phone, the event is either enabling or disabling it. At periodic intervals (e.g., one each minute), the data word for the time of each event is compared to the real time derived from a timer 72. If the time of the event equals the real time, the system controller 30 executes the event—i.e, toggles the enable/disable bit stored in the third location of the table of FIG. 7A.

Figure 8B:
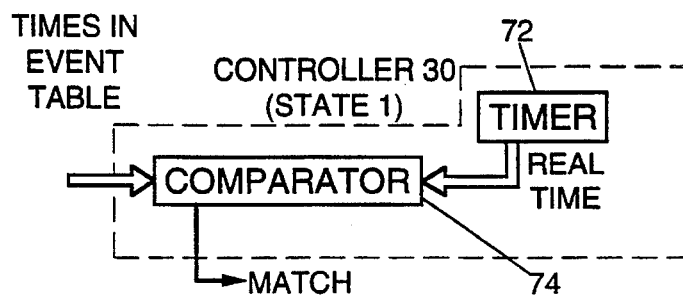
FIG. 8B are state machine diagrams (i) and (ii) of the system controller for controlling the student phone in connection with the data stored in the memory illustrated by the table of FIG. 8A.
Figure 8C:
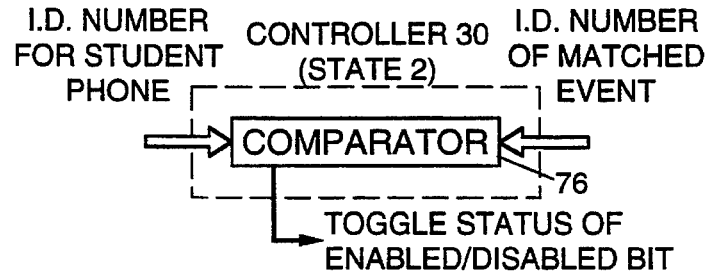

Referring to the state machines of FIG. 8B and 8C, the system controller 30 is configured as a comparator 74 in a first state (FIG. 8B) that compares each of the times stored in the table of FIG. 8A with the real time from the timer 72, which is simply a real time clock. If no match is found, the system controller 30 returns to the steps of the flow diagram of FIGS. 3A and 3B. If a match is found, however, the event data word is read and the event is executed. With respect to the invention, the event that is executed is the updating of the status of the student phone as defined by the enable/disable bit held in the third location of the table in FIG. 7A.

After the first state machine identifies an event for execution, a second state machine of FIG. 8C compares identification of the line or group of the lines 22(1) to 22(N₁) involved in the event with the identification of the line assigned a student phone class. If the line associated with the event is the student phone, then the remaining data in the event word simply defines the enable/disable status of the phone and the enable/disable bit is updated accordingly as indicated by the output signal from a comparator 76 of the state machine of FIG. 8C.

Referring briefly to the programming of the system controller 30, FIGS. 9A and 9B are exemplary illustrations of user interface screens that prompt a programmer to enter or update data stored in the EEPROM 38 related to the operation of the student phone. Each of the screens appears on the display screen of the PC 44 in connection with the programming of the system controller 30 by way of data and commands entered through keystrokes to a keyboard (not shown) of the PC. In the interface screen of FIG. 9A, the data in the first two locations of the table of FIG. 7A may be entered or updated—i.e., the maximum elapsed time T2 and the minimum time between calls to the same number. From the interface screen of FIG. 9B, the data in the table of events of FIG. 8A may be updated. In the illustrated example of the screen for programming the event table, the event for toggling the enable/disable bit in the third location of the table in FIG. 7A is encoded as numbers 5 and 6 as indicated by the annotation at the base of the screen. In the illustrated example, the student phone is enabled at 3:30 P.M. each day and disabled at 6:00 P.M.

In addition to programming the system controller 30 by way of the PC 44, the invention also contemplates at least some limited ability to program the controller by way of keystrokes entered into a keypad of one of the telephones 23(1) to 23(N₁). For example, in each of FIGS. 10 and 11 a sequence of keystrokes to a conventional keypad of one of the telephones 22(1) to 22(N₁) can access and update data locations in the EEPROM 38.

Figure 10:
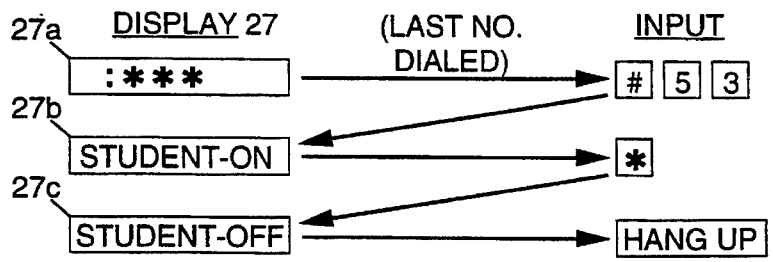
FIG. 10 is a flow diagram for executing an override feature from a system telephone in accordance with the invention.

In FIG. 10, a sequence of keystrokes to a keypad 51 of the telephone 23(1) manually overrides the enable/disable status of the student phone as defined by the enable/disable bit by accessing the memory location and toggling the value of the bit. In its normal operation, the information on the display 27 is the number of the last extension dialed from the telephone 23(1). In the illustration of FIG. 10, a left-hand column entitled "DISPLAY" is a series of prompts 27a, 27b and 27c displayed by the display 27 in response to a sequence of keystrokes to the keypad 51, which are illustrated in a column under the heading "INPUT."

Initially the display 27 prompts the user of the telephone 23(1) with the last number called. In display 27a of FIG. 10, three (3) asterisks are illustrated to indicate that the three digits of the last number called can be any number. After taking the telephone 23(1) off hook, the user enters the sequence "#", "5" and "3" by keystrokes to the appropriate keys of the keypad 51. In response to the entry of this command, the display 27 changes its prompt image to that of display 27b, which is the present status of the enable/disable bit in the third location in the table of FIG. 7A. In the example illustrated in FIG. 10, the bit is presently set to enable the student phone. To toggle the value of the bit and thus "override" the cycling of the student phone between enabled and disabled conditions as defined by the events in the event table of FIG. 8A, the user of the telephone 23(1) simply enters a keystroke to the asterisk key (*) as shown in FIG. 10. That keystroke changes the status of the enable/disable bit in memory, and the user of the telephone 23(1) is prompted by display 27c that the toggling has been executed. Assuming the status of the student phone is now as desired, the user places the telephone 23(1) on hook as indicated in FIG. 10 in order to terminate the sequence.

In accordance with another important feature of the invention, a student phone class can be assigned to one of the telephone lines 22(1) to 22(N₁) by way of keystrokes to the keypad 51 of a telephone on one of the lines. Preferably, the programming telephone is complemented by the display 27 as shown with the telephone 23(1) in FIG. 1 in order to prompt the user during the sequence of keystrokes necessary to assign a student phone class.

Figure 11:
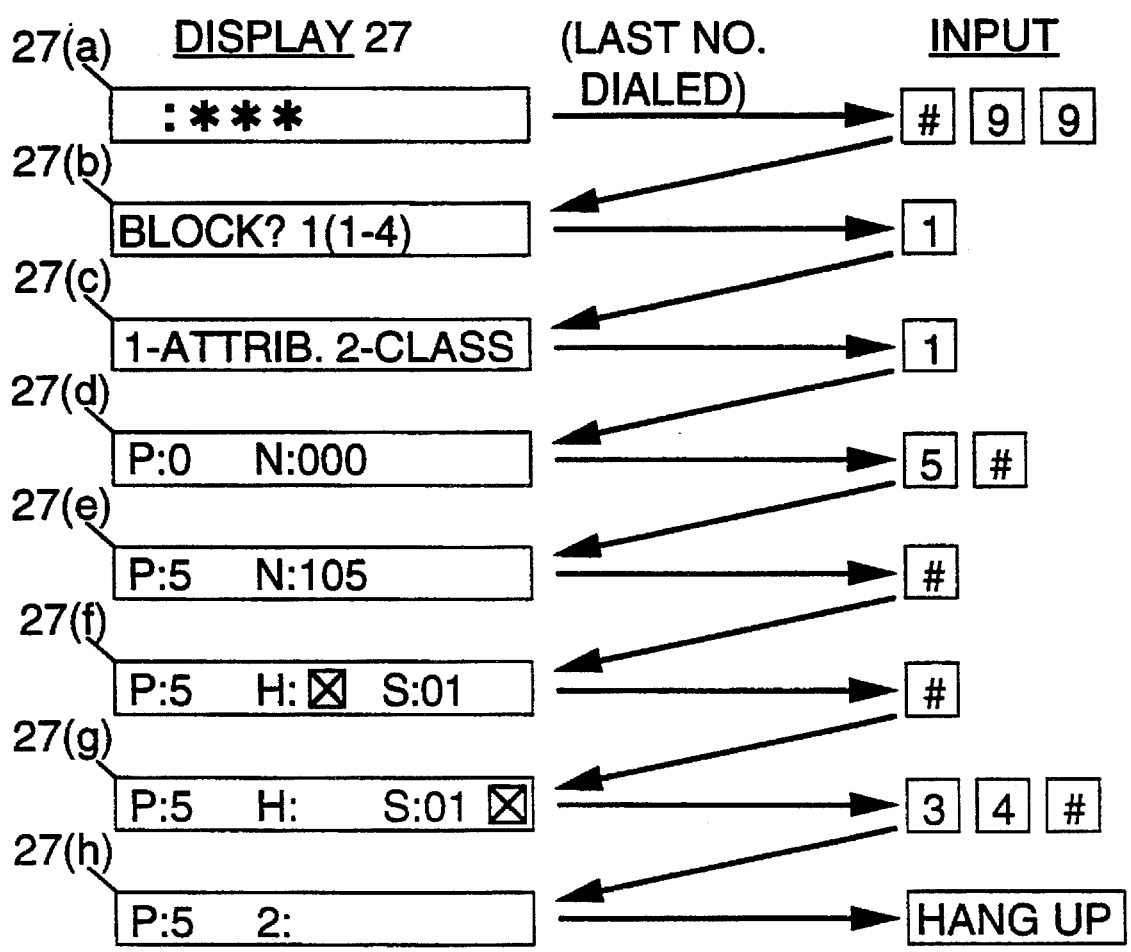
FIG. 11 is a flow diagram for configuring one of the telephone lines in the telephone system as a "student" phone in accordance with the invention by way of keystrokes to the keypad of a telephone in the system.

By way of example, FIG. 11 illustrates a sequence of keystrokes and visual prompts displayed by the display 27 (FIG. 1) that identifies a specific one of the telephone lines and assigns it a student phone class. In a left-hand column of FIG. 11 under the heading "DISPLAY", a sequence of prompts is illustrated that is displayed by the display 27 and which result from a sequence of keystrokes to the keypad 51 of the telephone 23(1) (FIG. 1). The sequence of keystrokes is illustrated in a right-hand column of FIG. 11 under the heading "INPUT". As the arrows spanning the two columns indicate, keystrokes cause a change in the information displayed on the display 27, which prompts the user to enter data or commands by way of further keystrokes until the sequence of keystrokes resulting in the assignment of a student phone class is complete.

Referring first to the first display 27a at the top of the column labeled "DISPLAY" in FIG. 11, the display is ordinarily the last number dialed from the telephone 23(1) to another telephone within the PBX system 20, which is typically a three digit number. Because this number can be any combination of digits, the digits in display 27a are shown as three (3) asterisks to indicate they can be any value. Sequential keystrokes "# 9 9" to the keypad of the telephone 23(1) transmit commands to the system controller 30 that allow the user to access a programming mode of the controller, which is acknowledged by a prompt illustrated by the second display 27b.

After the programming mode of the system controller 30 has been accessed, the user must know the proper system identification of the telephone line to be configured as a student phone. From the prompt in the second display 27b, the user must identify which one of the exemplary four (4) groups or blocks of telephone lines 22(1) to 22(N₁) includes the line to be configured as a student phone. In FIG. 11, the selected telephone line is in block 1, so the user enters the appropriate data word into the system controller 30 by way of a keystroke to the one (1) key of the telephone keypad. The system controller 30 responds to this keystroke by generating a new prompt that is illustrated by the third display 27c, which asks whether the user wants to review the configuration of the lines in the block ("1 ATTRIB") or review the available classes for use in the block ("2 - CLASS"). Assuming a student phone class is available for the lines of block 1, a keystroke to the one (1) key of the keypad 51 changes the displayed prompt to a listing of the configurations of the telephones in the block, starting with the first telephone line in numerical order.

In display 27d, the first telephone line is assigned the number zero (0), so the display reads "P" which stands for the "port" or "physical number" of the telephone line, followed by a colon and the number zero. For this first telephone line, the display indicates an architectural number ("n:000" in FIG. 11) that is not related to the present invention.

Assuming the first telephone line is to be configured as a student phone, the prompt of the display 27d causes the user to enter the number five (5) by way of keystrokes to the keypad 51 of the telephone 23(1), followed by entry of a pound sign (#). In this instance, the pound sign acts as an end of data word so that the system controller 30 knows the complete number has been transmitted. In response to the entry of the pound sign, the system controller 30 scrolls down the list of telephone lines in the group to the line identified as the fifth line as shown by the display 27e. By way of a keystroke to the key for the pound sign (#), the various data fields for configuring the fifth line can be scrolled across the display 27. A first keystroke to the pound (#) key causes the display 27f to appear, which includes a "hunt bit" denoted by "H" on the display. The icon ▓ in the display 27f denotes a flashing cursor position, and the symbol "S" denotes the class of the line. In the display 27f of FIG. 11, the class of line five (5) is presently "01" which might be a full service configuration that allows unlimited access to the public telephone network 24. To change the class of line five (5), the cursor is moved to the data field for the class by a further keystroke to the pound (#) key as shown by display 27g in FIG. 11. Then the user enters "3", "4" and "#" by way of appropriate keystrokes to the keypad 51, which causes the system controller 30 to replace the present class of "01" with that of "34", which configures the telephone line five (5) as a "student phone." The final display 27h in FIG. 11 prompts the user to program "zone" attributes of the telephone line. In this example, the re-configuration of the telephone line is complete so the phone is returned on the hook as indicated in FIG. 11.

As can be seen from the foregoing, an apparatus and method are provided for limiting the connection time of at least one selected telephone line of the telephone lines 22(1) to 22(N₁) of the PBX system 20 and the public networks 24. In keeping with the invention, the selected line or student phone is prevented from re-dialing the called number for a certain period of time or for a number of subsequent calls once the call exceeds a predetermined amount of time. The student phone may be enabled and disabled by the system only at predetermined times. If desired, the telephone system may also incorporate other conventional features including limited prefix dialing capabilities, limited area code dialing capabilities, blocking of incoming calls, and the like. +v,1-15/2

What is claimed is:

1. In a private branch exchange telephone system (PBX) arranged to connect a plurality of telephone lines associated therewith to a public telephone network, a method of limiting the time of connection of at least one of the telephone lines, comprising the steps of:

detecting a request for connecting the at least one telephone line to the public telephone network and a particular telephone, the request including a requested network sequence of numbers generated by keystrokes to a keypad connected to the telephone line;

comparing the requested network sequence of numbers with the contents of a memory storing previously recorded sequences of numbers, for:

1) denying the switching to the network of the requested network sequence of numbers when the requested network sequence corresponds to one of the previously recorded sequences of numbers; and 2) switching the requested network sequence of numbers to the network for connecting the telephone line to the particular telephone of the public telephone network when the requested network sequence does not correspond to one of the previously recorded sequences of numbers;

monitoring the elapsed time the telephone line is connected to the network;

recording the requested sequence of numbers in the memory when the elapsed time achieves a minimum predetermined time;

monitoring the telephone line for a manually entered request to terminate the connection to the network; and terminating the connection from the telephone line to the network telephone upon the earlier occurrence of:
  1) a manually entered request for termination; or
  2) the elapsed time achieving a maximum predetermined duration.

2. The method of claim 1 including the steps of detecting the connection of the telephone line to the network and in response thereto initializing the elapsed time.

3. The method of claim 2 including the steps of 1) obtaining a time value corresponding to the time of day and 2) storing the time value as an initial time.

4. The method of claim 2 wherein the step of monitoring the elapsed time comprises the steps of 1) obtaining an updated time value corresponding to the time of day and 2) comparing the updated time value to the initial time.

5. The method of claim 1 further comprising the step of enabling the telephone line only at predetermined time intervals such that the step of switching of the sequence of numbers to the network can occur only during the predetermined time intervals.

6. The method of claim 1 further comprising the steps of selecting a specific telephone line from the plurality of telephone lines and storing in a memory the maximum predetermined duration for a connection to the public telephone network from the selected telephone line.

7. The method of claim 1 wherein the step of recording the requested sequence of numbers in the memory includes the steps of 1) obtaining the time of connection for the telephone line, and 2) comparing the connection time to the predetermined minimum time, wherein the step of recording occurs only if the connection time exceeds the minimum time.

8. The method of claim 1 wherein the previously connected sequences of numbers are recorded sequentially, and the selective denial of the switching to the network of the requested sequence of numbers is determined by the quantity of previously connected sequences of numbers recorded between the requested network sequence of numbers and the corresponding one of the previously recorded sequences of numbers.

9. The method of claim 1 further comprising the step of recording a value identifying the time of day when the requested sequence of numbers is recorded, wherein the step of denying the switching of a requested sequence of numbers is selectively executed depending on a value of an elapsed time determined by the time between the current request to connect to the public telephone network and the recorded time of day for previous requests for that number.

10. The method of claim 1 further comprising the step of providing a warning to the user of the telephone line prior to the elapsed time achieving the maximum predetermined call time duration.

11. The method of claim 10 wherein the warning is an audible tone.

12. A telephone system for controlling access to trunk lines of a public telephone system, the system comprising a plurality of telephone lines, a switching network for connecting the lines to one another and to the trunk lines of the public system, a controller for selecting one or more of the telephone lines to have a limited allowable connection time to the trunk lines of the public system and disconnecting the connection between each of the selected telephone lines and the trunk lines provided by the network when the time of the connection equals or exceeds a maximum time of connection, a memory in the controller for storing a value for the maximum time of connection and for storing a value for a minimum time of connection, the controller including a historical table of the most recently called telephone numbers from the one or more selected telephone lines, the controller recording the telephone numbers from the one or more selected telephone lines to the historical table only when the time of connection equals or exceeds the minimum time of connection.

13. A telephone system as set forth in claim 12 wherein the historical table of the most recently called telephone numbers from the one or more selected telephone lines further includes the times of the calls, the memory further stores a value of the minimum time difference for calls to the same number, and the controller includes a comparator for comparing a telephone number presently being called from one of the selected telephone lines to the telephone numbers in the historical table and a second comparator for comparing the time of the present call with the time of the most recent call to the same number and enabling the switching network only if a value of the differences between the times is greater than the value of the minimum time difference stored in the memory.

14. A telephone system as set forth in claim 12 wherein the memory of the system controller includes a disabled/enabled status of the one or more selected lines and the controller includes a detector for detecting a request from one of the selected telephone lines for a connection to the trunk lines and enabling the switching network to provide the connection only when the status indicates the one or more selected lines is enabled.

15. A telephone system as set forth in claim 14 wherein the memory of the system controller includes a table of events that comprises events and the times they are to be executed and the controller includes a comparator for comparing the present times to the times of the events and executing one of the events when the present time equals the time of an event stored in the table.

16. A telephone system as set forth in claim 15 wherein one of the events in the table of events is the toggling of the value of the disabled/enabled status of the one or more selected telephone lines.

17. A telephone system as set forth in claim 12 wherein the system controller includes a comparator for comparing an area code of a dialed number, if any, from the one or more selected telephone lines to a table of area codes stored in the memory, comparing a prefix of the dialed number to a table of prefixes stored in the memory and enabling the switching network to connect the one or more selected telephone lines to the trunk lines only if the values of the area code and prefix are values allowed by the tables.

18. A telephone system as set forth in claim 16 including a user interface for overriding the toggling of the enabled/disabled status by the event table.

19. A telephone system as set forth in claim 18 wherein the user interface is a keypad of a telephone connected to one of the plurality of telephone lines.

20. A private branch exchange telephone system arranged to connect telephone extensions associated therewith to the public telephone network, the system comprising:

a switching network for connecting and disconnecting telephone extensions to and from the public telephone network;

a controller for controlling the switching network;

the controller including a processor and memory for comparing a connection time of a call to a predetermined maximum time and means for disconnecting the connection provided by the switching network when the connection time equals or exceeds the predetermined maximum time, and means for comparing the connection time of a call to a predetermined minimum time and for recording the dialed number in the memory only when the connection time equals or exceeds the predetermined minimum time.

21. A private branch exchange telephone system as set forth in claim 21 including means for warning a caller before disconnecting the extension from the network.

* * * * *